Patented May 30, 1939

2,160,578

UNITED STATES PATENT OFFICE 2,160,578

PRODUCTION OF ALIPHATIC AMINES

Willi Schmidt, Ludwigshafen-on-the-Rhine, Germany, assignor to I. G. Farbenindustrie Aktiengesellschaft, Frankfort-on-the-Main, Germany No Drawing. Application May 14, 1934, Serial No. 725,479. In Germany May 18, 1933

11 Claims. (Cl. 260—293)

The present invention relates to a process for the production of aliphatic amines.

I have found that valuable amines are obtained by treating aliphatic nitriles containing more than 6 carbon atoms per molecule, preferably in liquid phase, with hydrogen under pressure in the presence of hydrogenating catalysts and in the presence of ammonia or primary or secondary amines containing not more than 6 carbon atoms per molecule, such as methyl amine, ethyl amine, diethyl amine, propyl amine, butyl amine, piperidine, cyclohexylamine and the like. The reaction is preferably carried out at above 30 atmospheres. It is a considerable advantage of the process that the nitriles are hydrogenated to a far-going degree so that usually no or practically no unconverted nitrile remains behind and that it leads mainly to the valuable amines containing but one alkyl corresponding to the radicle of the high molecular aliphatic nitrile employed; for example if a nitrile containing more than 6 carbon atoms is hydrogenated in the presence of ammonia mainly primary amine is produced. If, however, nitriles of the said kind are hydrogenated in the presence for example of methyl amine, mainly amines are formed which contain only one radicle corresponding to the nitrile. According to the present invention the said amines containing but one alkyl group with more than 6 carbon atoms are usually formed in amounts of more than 50 per cent of the whole mixture of amines resulting from the reaction; in many cases the yield in the said compounds rises up to between 90 and 100 per cent.

Very suitable initial materials are for example the nitriles or mixtures of nitriles corresponding to the natural acids, for example capric nitrile, lauric nitrile, myristic nitrile, palmitic nitrile, stearic nitrile, montanic nitrile, oleic nitrile, mixtures of nitriles of the fatty acids contained in the coconut oil, nitriles of the mono- and dicarboxylic acids resulting from the oxidation of paraffinic hydrocarbons such as paraffin wax and other waxes, dipropyl acetic nitrile and the like. Most valuable initial materials are those containing from 8 to 28 carbon atoms per molecule.

Nitriles containing still further substituents in the molecule such as hydroxy, carboxylic or amino groups may also be employed. The nitriles may be prepared according to different methods. For example nitriles containing an even number of carbon atoms in the molecule may be prepared from the corresponding natural fatty acids or their derivatives by treatment with ammonia in the presence of catalysts; another method consists in treating acid amides with thionylchloride. Nitriles containing an uneven number of carbon atoms may be prepared for example by converting appropriate alkyl halides with alkali cyanides.

The catalytic treatment of the said carboxylic acid nitriles may often be effected with advantage in the liquid phase at temperatures between 50° and 200° C.; it is, however, possible to work at room temperatures or at higher temperatures than 200° C. and in special cases temperatures up to about 350° C. may be employed. The pressure to be employed is above atmospheric pressure, for example 20, usually above 30 atmospheres. The employment of very high pressures, for example up to 500 atmospheres and even more is especially valuable in cases when low temperatures are applied. The proportion of the partial pressures of the hydrogen and the ammonia (or low boiling amine) may vary considerably; for example the process may be carried out in the presence of a nickel catalyst under an ammonia partial pressure of 150 atmospheres and a hydrogen partial pressure of 50 atmospheres, i. e., under a total pressure of 200 atmospheres; on the other side the partial pressure of hydrogen may exceed that of ammonia (or the low boiling amine); by way of example it is stated that good results are obtained when treating a high molecular aliphatic nitrile in the presence of a cobalt catalyst under an ammonia partial pressure of 10 atmospheres and a hydrogen partial pressure of 90 atmospheres; the proportion of the ammonia partial pressure to the hydrogen partial pressure may also be 1:20. The said proportion is preferably varied in connection with the other reaction conditions and the result desired. If high partial pressures of ammonia are desired (for example when the process is carried out continuously by allowing the material to trickle over a rigidly arranged catalyst) it is necessary to work above the critical temperature of ammonia, i. e., above about 130° C.

As hydrogenating gas pure hydrogen or hydrogen in admixture with other gases or vapors, such as nitrogen, carbon monoxide or hydrocarbons may be employed.

The treatment may be effected with the addition of solvents whereby in many cases it is possible to exert a certain influence on the course of the reaction, for example as regards the proportion between primary and secondary amines formed. Certain solvents react with the nitriles employed or the amines formed or intermediate products produced in the reaction; for example in the treatment of lauric nitrile with hydrogen in the presence of ammonia in cyclohexanol, cyclohexyldodecylamine is obtained.

As catalysts any substance promoting hydrogenation may be employed, for example nickel, cobalt, copper and catalysts containing the said metals and if desired activating additions and/or precipitated on carriers. Mixed hydrogenation catalysts may also be employed. Especially suitable are those non-activated or activated catalysts which have proved useful in the catalytic reduction of fatty acids and their derivatives to the corresponding alcohols (see for example the British Patent No. 356,731) and in the catalytic conversion of acids and their derivatives to amines (see French Patent 761,952). Furthermore uniform or mixed nickel catalysts of the kind obtainable according to the French Patent 621,434 may also be employed. Most valuable are cobalt and copper catalysts which, if desired, contain additions such as difficulty reducible metal oxides. Under otherwise the same working conditions the proportion of primary and secondary amines is dependent to a certain degree on the nature of the catalyst.

It is preferable to mix the reacting substances intensely, for example by stirring or shaking or by allowing the liquid or dissolved initial materials to trickle over the catalyst or by allowing a suspension of the catalyst in the reaction material to trickle over suitable filling materials such as Raschig rings, aluminium gravel and the like.

The amines obtainable according to the present invention are suitable as assistants in the textile industry and as intermediate products in the production of assistants for the textile industry, pharmaceutical preparations and the like.

The following examples will further illustrate the nature of this invention, but the invention is not restricted to these examples. The parts are by weight, if not otherwise stated.

Example 1

3 parts of stearic nitrile, 10 parts of cyclohexane, 4 parts of ammonia and 1 part of a catalyst obtainable by reducing basic cobalt carbonate in a stream of hydrogen at 325° C., are treated at 100° C. with hydrogen under a total pressure of 200 atmospheres in a rotating high-pressure autoclave. The catalyst and the cyclohexane are removed from the reaction product and stearyl amine is obtained in a yield of above 90 per cent.

Example 2

A solution of 1 molecular proportion of copper nitrate and 2 molecular proportions of manganese nitrate are precipitated with sodium bicarbonate with the addition of bleaching earth. The preciptate formed is washed, dried and heated to 350° C.

3 parts of stearic nitrile obtainable by treatment of stearic amide with thionylchloride, 20 parts of cyclohexane, 4 parts of ammonia and 1 part of the catalyst described above are treated for 6 hours at 270° C. with hydrogen under a total pressure of 300 atmospheres. After working up the reaction mixture stearyl and distearyl amine are formed in good yields, the proportion of the said amines being 3:2.

Example 3

150 kilograms of a mixture of nitriles of the fatty acid contained in the coconut oil (obtainable by reacting coconut oil with ammonia in the presence of catalysts) are treated without special purification in the presence of 5 kilograms of the catalyst employed according to Example 1 with 5 kilograms of ammonia in a high-pressure autoclave having a volume of 400 liters with hydrogen at 100° C. under a pressure of 200 atmospheres. The reaction product is freed from the catalyst by filtration. 87 per cent thereof distil between 50° and 210° C. under a pressure of 20 millimeters. The composition of the mixture of amines formed corresponds to that of the fatty acids contained in the coconut oil.

Example 4

100 parts of oleic nitrile, 5 parts of the catalyst described in Example 1 and 8 parts of ammonia are treated in a stirring autoclave at from 80° to 100° C. with hydrogen under a pressure of 100 atmospheres until the pressure does no longer decrease. Oleylamine is obtained in a yield of about 90 per cent; it contains only small amounts of stearyl amine formed by hydrogenation of the double bond contained in the oleic nitrile.

Example 5

100 parts of distilled lauric nitrile are treated with the addition of 3 parts of the catalyst described in Example 1 at 100° C. with hydrogen containing ammonia under a pressure of 200 atmospheres until an absorption of hydrogen is no longer observed. Dodecylamine is obtained in a yield of from about 95 to 98 per cent.

Example 6

100 parts of lauric nitrile, 80 parts of methylamine, 10 parts of a tungsten sulphide catalyst prepared according to the British Patent No. 379,335 are treated in a high pressure vessel under a pressure of 200 atmospheres with hydrogen at 270° C. As soon as the absorption of hydrogen is finished the mixture is allowed to cool, freed from the catalyst and subjected to fractional distillation; 78 parts distil at between 115° and 145° C. under a pressure of 15 millimeters; the said distillate consists of dodecyl and methyldodecylamine.

If the conditions are varied somewhat, analogous results are obtained. For example from stearic nitrile and ammonia under similar conditions of temperature and pressure and in the presence of a tungsten sulphide catalyst which for example contains still other sulphidic components, for example molybdenum, cobalt or nickel sulphide, octodecylamine besides small amounts of di- and trioctodecylamine is obtained.

Example 7

100 parts of lauric nitrile, 80 parts of dimethylamine and 10 parts of a nickel catalyst activated by means of chromium (obtainable by producing a precipitate of nickel carbonate containing about 2 per cent of chromate, washing out the undesired soluble compounds, drying and reducing) are introduced into a pressure vessel and hydrogen is pressed in until the pressure at room temperature amounts to 100 atmospheres. The vessel is heated for about 8 hours at 180° C. During heating the pressure rises to 125 atmospheres. The reaction mixture is freed from the catalyst and subjected to fractional distillation in vacuo whereby 93 per cent of the theoretical amount of dodecyl amine are obtained.

Example 8

100 parts of lauric nitrile are heated with 200 parts of cyclohexylamine and 10 parts of a nickel catalyst activated by means of chromium (see Example 7) in a pressure vessel under a hydrogen pressure of about 200 atmospheres for about 8 hours at 180° C. The reaction product is separated from the catalyst; by fractional distillation in vacuo dodecylamine is obtained in an amount of 33 per cent, cyclohexyldodecylamine in an amount of 55 per cent of the theoretical yield.

Example 9

100 parts of lauric nitrile, 170 parts of piperidine and 10 parts of a nickel catalyst activated with chromium (see Example 7) are heated for about 8 hours at 180° C. in a pressure vessel under a hydrogen pressure of 200 atmospheres. By fractional distillation in vacuo of the reaction mixture freed from the catalyst dodecylamine is obtained in an amount of 60 per cent and dodecylpiperidine in an amount of 33 per cent of the theoretical yield.

Example 10

100 parts of lauric nitrile, 150 parts of diethylamine and 10 parts of a nickel catalyst activated by means of chromium (see Example 7) are heated for about 8 hours at 180° C. under a hydrogen pressure of 200 atmospheres. The product is freed from the catalyst and subjected to fractional distillation in vacuo. 77 parts of a mixture of amines distils from 120° to 170° C. under a pressure of 22 millimeters; the said mixture consists of about equal parts of dodecylamine and diethyldodecylamine.

If the amount of diethylamine used is increased, the other conditions being the same as indicated above, a mixture of amines results which consists mainly of diethyldodecylamine.

Example 11

100 parts of lauric nitrile, 80 parts of methylamine and 10 parts of a nickel catalyst activated with chromium (see Example 7) are heated for about 8 hours at 70° C. in a pressure vessel under a hydrogen pressure of 200 atmospheres. The reaction product is freed from the catalyst and subjected to fraction distillation in vacuo, 93 parts of a mixture of dodecylamine and methyldodecylamine (boiling from 120° to 150° C. under a pressure of 20 millimeters) being thus obtained.

By way of comparison it is stated that if lauric nitrile is treated in the absence of ammonia or a low boiling amine but under otherwise the same conditions as indicated in Examples 8, 9, and 10 and in the first paragraph of the present example, about 10 per cent of the theoretical yield of dodecylamine are obtained only.

Example 12

800 parts of the mixture of nitriles obtainable from the fatty acids of palm kernel oil, 20 parts of a cobalt catalyst obtainable by reducing basic cobalt carbonate in a stream of hydrogen at about 325° C., and 40 parts of ammonia are treated at from 105 to 115° C. under a hydrogen pressure of 200 atmospheres. As soon as the absorption of hydrogen is completed the pressure is released and 230 parts of acrylic nitrile are introduced into the reaction vessel. The mixture is stirred for one hour at about 100° C., 160 parts of ammonia are added and 200 atmospheres of hydrogen are pressed in. As soon as the absorption of hydrogen setting in again is completed, the mixture is allowed to cool, freed from the catalyst by filtration and distilled under a pressure of 3 millimeters. 950 parts of a mixture of amines distils between 110° and 240° C. The amines contained in the said mixture correspond to the formula $R.NH.CH_2.CH_2.CH_2.NH_2$ wherein R is the radicle corresponding to the carbon skeleton contained in the nitriles employed.

Example 13

100 parts of a mixture of nitriles (derived from fatty acids from the oxidation of paraffinic hydrocarbons such as paraffin wax and distilling at from 90° to 180° C. under a pressure of 15 millimeters mercury gauge) and 2 parts of a cobalt catalyst prepared as described in Example 1 are treated in a hydrogen-ammonia atmosphere under a pressure of 300 atmospheres at 110° C. About 95 parts of a mixture of amines which corresponds to the nitriles employed and which distils from 70° to 170° C. under a pressure of 10 millimeters, are obtained.

What I claim is:

1. The process of producing amines, which comprises treating an aliphatic nitrile containing nitrogen only in the nitrile group and containing more than 6 aliphatic carbon atoms in the molecule with a gas comprising essentially hydrogen in the presence of a hydrogenation catalyst and of a non-aromatic amine containing at least one reactive hydrogen atom attached to the amino nitrogen and at most 6 carbon atoms in the molecule.

2. The process of producing amines, which comprises treating an aliphatic nitrile containing nitrogen only in the nitrile group and containing more than 6 aliphatic carbon atoms in the molecule with hydrogen in the presence of a hydrogenation catalyst and of a non-aromatic amine containing at least one reactive hydrogen atom attached to the amino nitrogen and at most 6 carbon atoms in the molecule.

3. The process of producing amines, which comprises treating an aliphatic nitrile containing nitrogen only in the nitrile group and containing more than 6 aliphatic carbon atoms in the molecule with hydrogen under a pressure of at least 30 atmospheres in the presence of a hydrogenation catalyst and of a non-aromatic amine containing at least one reactive hydrogen atom attached to the amino nitrogen and at most 6 carbon atoms in the molecule.

4. The process of producing amines, which comprises treating an aliphatic nitrile containing nitrogen only in the nitrile group and containing more than 6 aliphatic carbon atoms in the molecule in the liquid phase with hydrogen at a temperature between room temperature and 350° C. under a pressure of at least 30 atmospheres in the presence of a hydrogenation catalyst and of a non-aromatic amine containing at least one reactive hydrogen atom attached to the amino nitrogen and at most 6 carbon atoms in the molecule.

5. The process of producing amines, which comprises treating an aliphatic nitrile containing nitrogen only in the nitrile group and containing more than 6 aliphatic carbon atoms per molecule in the liquid phase with hydrogen under a pressure of at least 30 atmospheres in the presence of a hydrogenation catalyst and of a non-aromatic amine containing at least one reactive hydrogen atom attached to the amino nitrogen and at most 6 carbon atoms in the molecule.

6. The process of producing amines, which comprises treating a nitrile of a naturally occurring fatty acid said nitrile containing more than six aliphatic carbon atoms per molecule in the liquid phase with hydrogen under a pressure of at least 30 atmospheres in the presence of a hydrogenation catalyst and of a non-aromatic amine containing at least one reactive hydrogen atom attached to the amino nitrogen and at most 6 carbon atoms in the molecule.

7. The process of producing amines, which comprises treating a mixture of nitriles of naturally occurring fatty acids said nitriles containing more than six aliphatic carbon atoms per molecule in the liquid phase with hydrogen under a pressure of at least 30 atmospheres in the presence of a hydrogenation catalyst and of a non-aromatic amine containing at least one reactive hydrogen atom attached to the amino nitrogen and at most 6 carbon atoms in the molecule.

8. The process of producing amines, which comprises treating a mixture of nitriles of carboxylic acids resulting from the oxidation of high molecular paraffinic hydrocarbons said nitriles containing more than six aliphatic carbon atoms per molecule in the liquid phase with hydrogen under a pressure of at least 30 atmospheres in the presence of a hydrogenation catalyst and of a non-aromatic amine containing at least one reactive hydrogen atom attached to the amino nitrogen and at most 6 carbon atoms in the molecule.

9. The process of producing amines, which comprises treating an aliphatic nitrile containing nitrogen only in the nitrile group and containing more than 6 aliphatic carbon atoms in the molecule with a gas comprising essentially hydrogen in the presence of a hydrogenation catalyst and a heterocyclic amine, having at the most 6 carbon atoms in the molecule.

10. The process of producing amines, which comprises treating an aliphatic nitrile containing nitrogen only in the nitrile group and containing more than 6 aliphatic carbon atoms in the molecule with a gas comprising essentially hydrogen in the presence of a hydrogenation catalyst and cyclohexylamine.

11. The process of producing amines, which comprises treating an aliphatic nitrile containing nitrogen only in the nitrile group and containing more than 6 aliphatic carbon atoms in the molecule with a gas comprising essentially hydrogen in the presence of a hydrogenation catalyst and piperidine.

WILLI SCHMIDT.